United States Patent Office 2,961,798
Patented Nov. 29, 1960

2,961,798
PROTECTION OF PLANTS AGAINST FROST DAMAGE

Louis E. Wells, Jackson, Miss., assignor to Dumas Milner Corporation, Jackson, Miss., a corporation of Mississippi No Drawing. Filed Mar. 9, 1959, Ser. No. 797,877

5 Claims. (Cl. 47—2)

This invention relates to the protection of plant life from damage caused by freezing temperatures or frost.

Frost or freezing temperatures cause heavy economic losses in many forms of plant life. The art has long sought a simple and inexpensive method of preventing or minimizing frost damage to plant life. Prior art methods, including preventing heat radiation by the use of smoke, heating of the air by fuel burners and providing cover for plants in the form of paper or cloth shields, have been found expensive and often undependable.

Accordingly, it is among the objects of this invention to provide simple, inexpensive and effective methods of protecting living plants from frost damage.

A further object of the invention is to provide methods and compositions for protecting plants from frost damage which afford protection for extended periods of time and which are effective on all economic plant life subject to frost damage without regard to the plant size or the size or topography of the site on which the plants are grown.

Another object of the present invention is to provide methods and compositions for protecting plants from frost damage which involve the use of conventional spraying methods and apparatus.

Other objects and advantages of the invention will be apparent to those skilled in the art from the following description.

The term "frost damage" as used herein designates damage due to subfreezing temperatures, whether or not it is accompanied by the feathery ice crystal formation commonly known as frost or hoar frost. Hence, frost damage, as used herein, includes damage arising from temperatures lower than 32° F., which may be accompanied by snow, sleet, frost or "black frost," i.e. subfreezing temperatures accompanied by low relative humidity whereby no ice crystals are formed.

The method of this invention for protecting living plants from frost damage generally involves applying to the plant a compound selected from the group consisting of N-lower alkyl-2-pyrrolidones, 2-pyrrolidone and butyrolactone. The compound is preferably in a non-phytotoxic carrier, such as water, oil-in-water emulsions, glycols, oils, or other liquid carriers which are not toxic to plant life. The compound is preferably applied by spraying.

It has been found that these compounds, all possessing the pentatomic heterocyclic ring, have the unique property of enabling plants to withstand subfreezing temperatures.

It has been found that sprays containing from about 0.01 percent to about 2 percent of N-lower alkyl-2-pyrrolidone, 2-pyrrolidone or butyrolactone are effective in preventing frost damage to plants. Larger quantities are uneconomical although they are not deleterious to most plants. The compounds, in the form of a solution, emulsion or dispersion, are sprayed onto the leaves, stalks, fruit, buds, flowers, etc. of living plants and are effective to protect the coated parts against frost damage.

The carrier for the polymer must be one which is not toxic to plants. Water alone may be used as the carrier, but it is preferred to employ a carrier which adheres to plants more readily, such as an oil-in-water emulsion or the like. Such emulsions are well known in the art as carriers for insecticides or herbicides and include so-called plant-spray oils (refined mineral oils of a wide range of viscosities) water, and a suitable emulsifier or surface-active agent. The surface-active agent in such emulsions must not, of course, be phytotoxic in the concentrations used, and may be anionic, non-ionic, or cationic, to suit particular compositions. Additional carriers include glycols, glycerol, glycol ethers and the like.

While not intending to be bound by any particular theory of operation, it appears that the active compound penetrates into the plant cell structure and lowers the freezing point of the cell fluids, thereby enabling the plant to withstanding temperatures below freezing without damage.

The following examples illustrate the invention. All parts are by weight.

Example I

| | Percent |
|---|---|
| N-methyl-2-pyrrolidone | 0.5 |
| Water | 99.5 |

The above composition is effective to prevent frost damage on plants. Specifically, the solution was sprayed on a group of avocado plants. The treated plants withstood two hours at 29° F. without frost damage. A group of untreated control plants sustained severe frost damage when subjected to the same conditions.

In practice, aqueous solutions of the compounds are prepared in concentrated form, and diluted at the time of use to the proper concentration in the range of 0.01 percent to 2 percent by weight. Aqueous solutions containing 0.03 percent, 0.1 percent, 0.25 percent, 1 percent and 2 percent, of N-methyl-2-pyrrolidone were found effective as frost damage preventives.

Example II

| | Percent |
|---|---|
| 2-pyrrolidone | 25.0 |
| Water | 75.0 |

Example III

| | |
|---|---|
| Butyrolactone | 25.0 |
| Water | 75.0 |

Portions of the above compositions of Example II and III were diluted with water to give compositions containing 0.1%, 0.5% and 1% of active ingredients.

The resulting sprays afforded protection against frost damage when sprayed on plants as in Example I.

Example IV

| | Percent |
|---|---|
| N-methyl-2-pyrrolidone | 10.0 |
| Plant spray oil 90–110 USS | 50.0 |
| Nonyl phenol-ethylene oxide condensate (emulsifier) | 5.0 |
| Water | 35.0 |

Example V

| | |
|---|---|
| 2-pyrrolidone | 15.0 |
| Triethanolamine lauryl sulfate | 5.0 |
| Kerosene | 60.0 |
| Water | 20.0 |

Example VI

| | |
|---|---|
| Butyrolactone | 20.0 |
| Kerosene | 50.0 |
| Sorbitan monolaurate (emulsifier) | 10.0 |
| Water | 20.0 |

Portions of the above compositions of Examples IV–VI were diluted with water to give compositions containing 0.01%, 0.1%, 0.5% and 2% of active material. The resulting sprays were effective in preventing frost damage to Pedilanthus plants at 30° F., 29° F., 27° F. and 25° F., respectively.

Example VII

| | Percent |
|---|---|
| N-methyl-2-pyrrolidone | 0.5 |
| Tetraethylene glycol | 10.0 |
| Water | 89.5 |

The above composition was an effective frost damage preventive.

Example VIII

| | Percent |
|---|---|
| 2-pyrrolidone | 1.0 |
| Glycerol | 20.0 |
| Water | 79.0 |

The above composition was an effective frost damage preventive.

Example IX

| | Percent |
|---|---|
| Butyrolactone | 20.0 |
| C-dodecyl betaine (cationic surface-active agent) | 5.0 |
| Hexylene glycol | 5.0 |
| Plant spray oil 90–110 USS | 40.0 |
| Water | 30.0 |

Portions of the above were diluted with water to give concentrations of 0.05%, 0.15%, 0.75% and 1%, were effective in protecting plants against frost damage.

Example X

| | Percent |
|---|---|
| 2-pyrrolidone | 0.5 |
| Ethanol | 20.0 |
| Trichlorofluoromethane | 55.0 |
| Dichlorodifluoromethane | 24.5 |

The above was packaged in a pressurized aerosol container to give a self-spraying package for small applications. It was an effective frost damage preventive.

Example XI

| | Percent |
|---|---|
| N-methyl-2-pyrrolidone | 0.4 |
| Ethanol | 20.0 |
| Plant spray oil | 10.6 |
| 1,2-dichloro-1,1,2,2-tetrafluoroethane | 45.0 |
| 1-chloro-1,1-difluoroethane | 24.0 |

The above was packaged in a pressurized aerosol container and use as in Example X.

Example XII

| | Percent |
|---|---|
| Butyrolactone | 0.4 |
| Ethanol | 20.0 |
| Trichlorofluoromethane | 55.0 |
| Dichlorodifluoromethane | 24.6 |

The above was packaged in a pressurized aerosol container and used as in Example X.

Example XIII

| | Percent |
|---|---|
| N-ethyl-2-pyrrolidone | 0.5 |
| Tall oil-ethylene oxide condensate | 2.0 |
| Mineral plant spray oil | 20.0 |
| Water | 77.5 |

The above spray was effective in protecting plants against frost damage.

The compositions of Examples I–XIII have been tested by application to living plants subjected to frost and to temperatures below freezing occurring from actual atmospheric conditions. In such tests ornamental plants and shrubs were treated and marked with adjacent plants of the same varieties left untreated as controls. In such tests the composition did not harm the treated plants and they were observed to be protected from frost and freezing damage which injured or killed adjacent control plants.

Further tests upon living plants were conducted by constructing an enclosed insulated chamber which could be chilled by suitable refrigeration to obtain frost or freezing conditions (depending upon the humidity). Plants to be tested were obtained from a nursery and in each test at least two substantially identical control plants were selected, one (low temperature control) being subjected to the same low temperature conditions as the treated plant and the other held at room temperature to furnish a basis for comparing the tested plants with an untested standard.

A typical test was conducted upon Pedilanthus, a succulent, frost-susceptible plant, by selecting four well-developed specimens; one was subjected to the low temperature test without treatment with the protective composition, two were subjected to the low temperature test after being treated by the application of a light spray of the protective composition to form a film upon the plant surfaces, and one specimen was held at room temperature. The low temperature test began with the chamber at 75° F. It was gradually chilled to a uniform temperature of 30° F. and this temperature was maintained for three hours. The plants treated with the protective composition of the present invention showed traces of frostburn, but only on the tips and edges of the leaves. The vegetative parts, leaf surfaces, stems, etc., showed no evidence of frost damage. The plant that was untreated and subjected to the same frigid conditions sustained severe frost damage to all vegetative parts other than the base of the main stems. It was almost completely devoid of sound leaves, and the apex of every shoot was killed back for a distance of 4 to 6 inches.

Further tests using substantially the same procedure were conducted using the composition of Example 1, and specimens of a number of species of plants, including avocado, orange, lemon, caladium, Allamanda and grapefruit. In a series of tests in which the tested plants were maintained at 29° F. for at least an hour, specimens of avocado, coffee plant and Allamanda were completely protected by applying a light spray of the composition of the present invention to the surfaces of the plant to form a thin film thereon so that no damage was observed. The low temperature control plants all showed varying degrees of frost damage to the leaves.

In further similarly conducted tests of the composition of Example 1, using, simultaneously, specimens of avocado, coffee plant, grapefruit and Pedilanthus, a temperature of 26° F. was maintained for one hour with the plants kept for more than four hours below freezing. In this test the control specimen of Pedilanthus was completely wilted and tissues blackened whereas the treated specimen showed only a trace of wilt and no serious damage. The avocado and coffee plants which were not treated showed leaf damage and the treated specimens showed only a slight trace of wilt upon a very few apex leaves. The grapefruit specimen without treatment was only slightly damaged and the treated specimen showed no damage.

The test at 26° F. was repeated using the same species of plants and adding orange plants, and the temperature at 26° F. was maintained for three hours. The results were substantially the same, with all untreated plants showing prominent damage. The treated plants were only slightly damaged by wilt or burn of some young growth and leaf tips.

Similarly, the compositions of Examples II–XIII were tested at temperatures ranging down to 24° F. Compositions containing the active ingredient in the range of ½ percent were completely effective at 24° F.; lesser amounts of active ingredient protected plants at somewhat higher freezing temperatures. In all the tests, there was no evidence of injury to the plants as a result of the application of the compositions.

While the invention has been described in terms of certain examples, such examples are to be considered illustrative rather than limiting, and it is intended to cover all further modifications and embodiments that fall within the spirit and scope of the appended claims.

I claim:

1. The method of protecting living plants from frost damage which comprises applying to the plant a film of a compound selected from the group consisting of an N-lower alkyl-2-pyrrolidone, 2-pyrrolidone and butyrolactone in a non-phytotoxic carrier.

2. The method set forth in claim 1 wherein said compound is N-methyl-2-pyrrolidone.

3. The method set forth in claim 1 wherein said compound is 2-pyrrolidone.

4. The method set forth in claim 1 wherein said compound is butyrolactone.

5. The method of protecting living plants from frost damage comprising applying to the plant a film of 0.10% to 2% by weight of a compound selected from the group consisting of an N-lower alkyl-2-pyrrolidone, 2-pyrrolidone and butyrolactone in a non-phytotoxic carrier.

References Cited in the file of this patent

UNITED STATES PATENTS

| | | |
|---|---|---|
| 1,995,853 | Hunsaker | Mar. 26, 1935 |
| 2,185,663 | Greenstreet | Jan. 2, 1940 |
| 2,875,555 | Thiegs | Mar. 3, 1959 |

FOREIGN PATENTS

| | | |
|---|---|---|
| 159,544 | Australia | Nov. 1, 1954 |

OTHER REFERENCES

Condensed Chemical Dictionary, fifth edition, published by Reinhold (N.Y.), 1956; page 194 relied on.